United States Patent
Juhlin

[11] 4,023,086
[45] May 10, 1977

[54] CONTROL SYSTEM FOR RECTIFIER EQUIPMENT

[75] Inventor: Lars-Erik Juhlin, Ludvika, Sweden

[73] Assignee: ASEA Aktiebolag, Vasteras, Sweden

[22] Filed: June 5, 1975

[21] Appl. No.: 584,004

[30] Foreign Application Priority Data
July 10, 1974 Sweden .................... 74090648

[52] U.S. Cl. .................... 321/11; 321/47
[51] Int. Cl.² .................... H02M 1/08
[58] Field of Search .......... 321/5, 12, 18, 38, 40, 321/47, 11; 307/252 P, 252 N; 328/10

[56] References Cited
UNITED STATES PATENTS

| | | | |
|---|---|---|---|
| 3,467,848 | 9/1969 | Ainsworth | 321/5 |
| 3,582,755 | 6/1971 | Liss et al. | 321/5 |
| 3,648,147 | 3/1972 | Leete | 321/5 |
| 3,764,882 | 10/1973 | Reeve et al. | 321/5 |
| 3,767,999 | 10/1973 | Ekstrom | 321/40 |
| 3,863,134 | 1/1975 | Pollard | 321/5 |

Primary Examiner—William H. Beha, Jr.
Attorney, Agent, or Firm—Watson, Cole, Grindle & Watson

[57] ABSTRACT

A control system for a rectifier unit for high voltage direct current transmission includes a control pulse emitter for the valves of the rectifier unit and a regulator for setting the control angle of the control pulse emitter. A signal limiter is provided on the output side of the regulator for limiting the control signal in response to an increase of the voltage of the rectifier unit towards a smaller control angle. The control system is provided with an arrangement which senses the control angle of the control pulse emitter, such arrangement being connected to the signal limiter in such a way that the upper limit of the magnitude of the control signal decreases with a decreasing control angle.

3 Claims, 5 Drawing Figures

CONTROL SYSTEM FOR RECTIFIER EQUIPMENT

BACKGROUND OF THE INVENTION

1. Field of the Invention

The present invention relates to a control system for rectifier equipment for transmission of high voltage direct current, the system including a control pulse emitter for the valves of the regulator unit and a regulator for setting the control angle of the control pulse emitter, the regulator being provided on its output side with a signal limiter for limiting the control signal when the voltage of the rectifier unit is increased towards a smaller control angle.

2. The Prior Art

Upon starting such a rectifier unit, the rectifiers are normally deblocked at a relatively great control angle — upwards of 90° or more — which can be made by setting a high lower limit for the control angle. When, thereafter, this limit is reduced, the regulator of the rectifier unit will decrease the control angle and thus increase the direct voltage until the desired current or power is obtained.

However, if the inverter situated at the other end of the DC transmission for some reason does not start working and thus does not become conducting, no direct current will grow in the rectifier unit, and therefore its regulators will continue to increase the direct voltage of the rectifier unit, which direct voltage may reach considerable values, especially as the "open", that is, interrupted line, will reflect the direct voltage. This may cause the transmission line to be exposed to dangerous overvoltages. This is most serious in the case of cable transmissions, where the smoothing reactor and the cable together form an oscillating circuit, since overvoltages are more serious for a cable than for an overhead line.

To prevent the risk of overvoltages, a relatively high lower limit for the control angle of the rectifiers can be maintained until it has been established that the transmission really will be conducting, or the magnitude of the control signal, or the change of this magnitude, may be limited. In this way major overvoltages may be avoided, but at the expense of the control speed. A compromise solution which keeps overvoltages as well as the control speed within the desired limit seems difficult to reach.

SUMMARY OF THE INVENTION

According to the invention, it is therefore proposed to introduce a limitation of the control angle or its change, and to let this limitation be dependent on the control angle. This is accomplished by providing means for sensing the control angle of the control pulse emitter, which means is connected to the signal limiter in such a way that the upper limit of the magnitude of the control system decreases with a decreasing control angle. The actual value of the control angle may then be the starting-point, or the change in the control angle may be sensed.

BRIEF DESCRIPTION OF THE DRAWINGS

In other respects, the invention will be explained in greater detail with reference to the accompanying drawings, in which FIG. 1 shows the basic principle of limiting the control of a rectifier unit in a DC transmission, whereas

FIG. 1 shows a DC transmission comprising a rectifier station 41 and an inverter station 42, connected together by a DC line 43 for high voltage. The valves of the rectifier unit receive control pulses with a certain control angle from a control pulse generator 44 controlled from a regulator 45. To the input side of the regulator there is connected a reference value for the direct current, for example obtained from a potentiometer 46, and the actual value of the current is measured by a transductor 47. Similar control equipment is present in the inverter.

According to the usual principles of control, where the actual value of the current is set a little higher in the rectifier station than in the inverter station, the latter will be controlled towards the maximum control angle and dictates the line voltage $U_L$, whereas the rectifier unit increases its voltage so that the correct direct current is obtained. FIG. 2 shows curves for increasing the voltage of the rectifier to the line voltage $U_L$, when the line is interrupted, for example because of an interruption in the inverter, so that no direct current can pass through. $U_L$ then reaches a higher value than the normal line voltage.

The ideal voltage increase process is according to c, that is, a rapid increase of the voltage to the value $U_L$ and no further. This is, however, difficult to attain since the rapid increase in voltage will inevitably lead to a short overvoltage according to the curve a because of reflections in the interrupted line.

Figure 2:
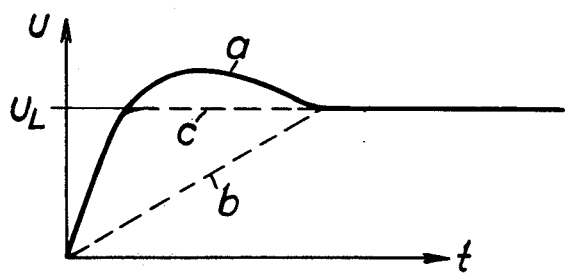
FIG. 2 shows in diagram form how such a control operates.

To avoid this it is possible to introduce a limiting device comprising a limit value emitter in the form of a potentiometer 48 on the output from the regulator 45, said potentiometer 48 being connected by way of the diode 49. The diode 49 is so directed that it becomes conducting if the actual value of the rectifier current is lower than the desired value by an amount which is determined by the setting of 48. This will limit the speed of the voltage increase, that is, the allowed reduction of the control angle $\alpha$ per commutation, and an overvoltage according to the curve a is thus counteracted. A limitation of the voltage increase according to the curve b in FIG. 2 is obtained, but at the same time a rather slow voltage increase.

DESCRIPTION OF THE PREFERRED EMBODIMENTS

Figure 3:
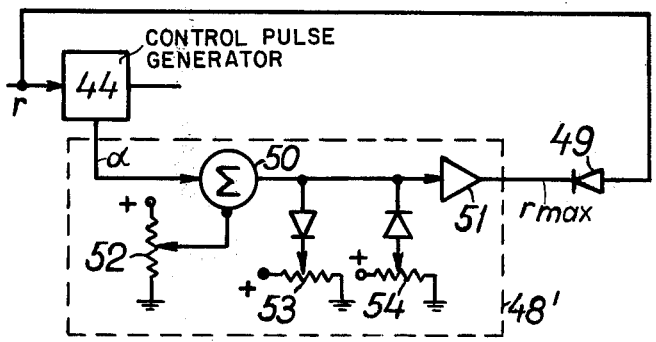
FIGS. 3 and 5 show different ways of modifying the limitation of the control according to the invention, thus attaining a quick enough control without overvoltages.

An improved function is obtained according to the invention by making the limit value emitter dependent on the magnitude of the control angle $\alpha$, emitted by the control pulse generator 44, for the rectifiers as indicated in FIG. 3.

Figure 1:
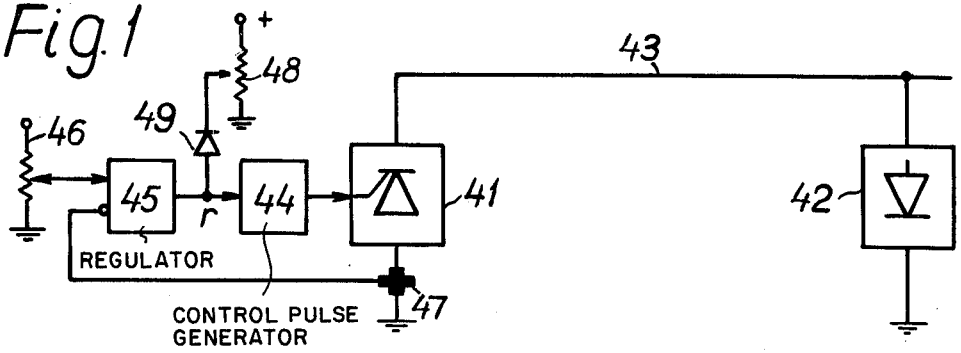

FIG. 3 shows a limit value emitter 48' corresponding to 48 in FIG. 1 and connected by way of the diode 49 as in FIG. 1. The control pulse generator 44 is then provided with an additional output which determines the magnitude of the control angle $\alpha$. By the operation of a summator 50 and an amplifier 51, the value $\alpha$ will determine the limit value $r_{max}$, connected over the diode, of the control signal r from the regulator 45. The limit value $r_{max}$ is further defined by the provision of the circuits 52, 53 and 54, so that it acquires a progress in relation to $\alpha$ according to the curve in FIG. 4

Figure 4:
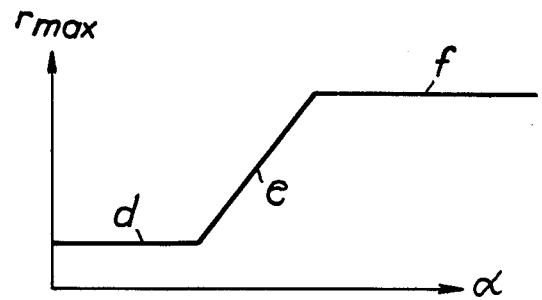
FIG. 4 shows a diagram of how the limit value indicator according to FIG. 3 works.

With the help of the circuits 53 and 54 — each comprising a potentiometer and a diode — the upper and lower value, respectively, of $r_{max}$ is fixed, corresponding to the horizontal lines $f$ and $d$, respectively, in FIG. 4. The slope of the line $e$ therebetween is determined by the amplifier 51 and the position of the sloping part is determined by the output terminal on the potentiometer 52 connected to the summator 50.

It is thus clear that, if the voltage of the rectifier unit is strongly reduced, that is, works with a large control angle, a large control signal $r$ from 45 to 44 is allowed, corresponding to the curve f in FIG. 4. According as the rectifier unit is then controlled towards a lower control angle, that is within the range e for $\alpha$, $r_{max}$ will be strongly limited with a decreasing value until the lowest value of $r_{max}$ has been reached, corresponding to the line $d$.

As a rule, the regulator 45 in FIG. 1 is constructed so that it senses the derivative of the current besides the actual value of the direct current. This means that, in the case of small variations in the direct current, the reduction of the voltage of the rectifier with increasing current will be made rapidly, whereas the subsequent increase in voltage will be slow because of the limitation of the signal $r$. The result in case of current oscillations will therefore be a reduction of the voltage of the rectifier unit.

Figure 5:
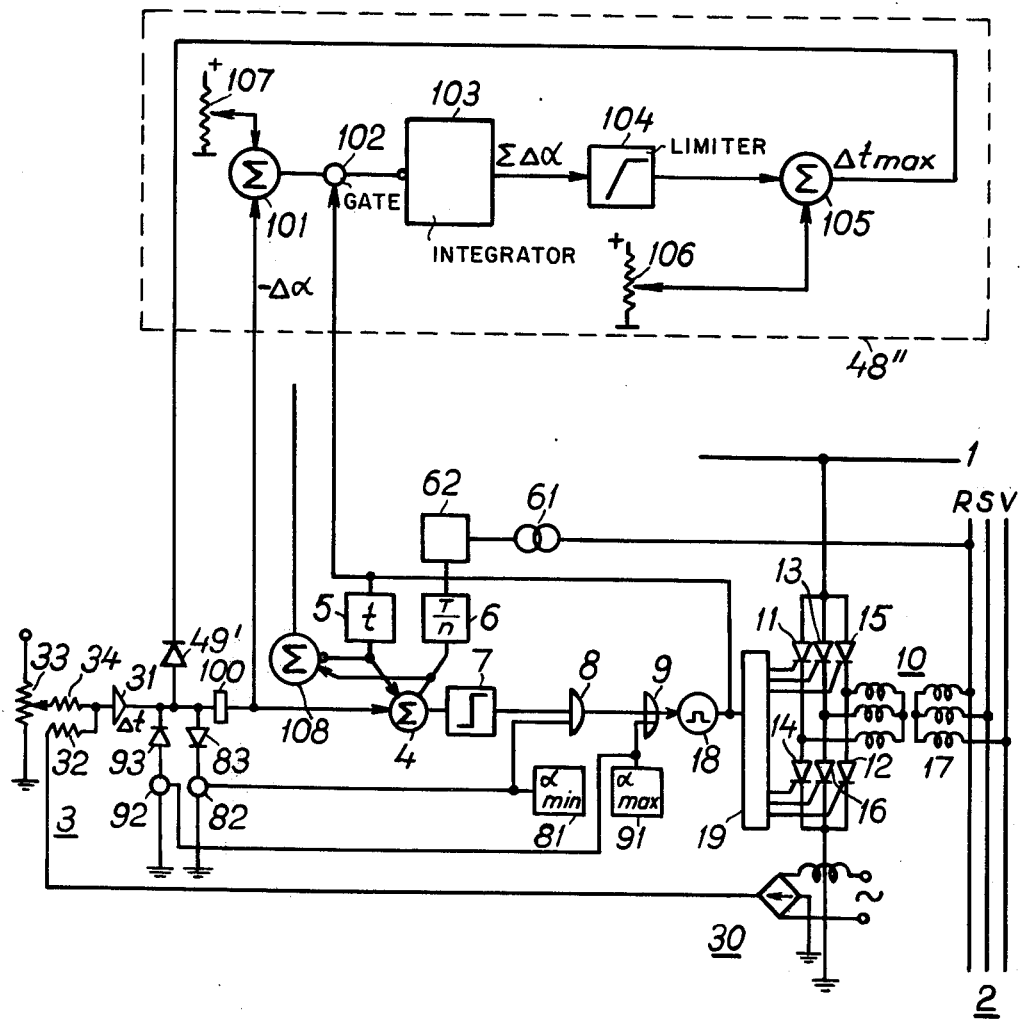

To avoid this current reduction, it is possible, instead of letting $r_{max}$ be affected by the actual value of $\alpha$, to let $r_{max}$ be affected by the changes in $\alpha$, as shown in FIG. 5 where the invention is applied to a control system according to U.S. Pat. No. 3,551,778.

FIG. 5 shows a control system, the lower part of which corresponds completely with FIG. 1 in the above patent and has the same reference numerals. The limit value emitter 48'' — corresponding to 48 and 48' in FIGS. 1 and 3, respectively — is connected to the output on the control amplifier 31 by way of the diode 49, corresponding to 49 in FIGS. 1 and 3, the actual value and desired value of the direct current being connected to the input side of said control amplifier 31.

The control pulse generator 4- 7, corresponding to 44 in FIG. 1, is constituted as an oscillator which, with the help of the member 5, measures the time since the last commutation and in stationary operation delivers the next control pulse when this time is equal to the period of the AC network RSV divided by the pulse number of the rectifier unit. The control signal from 31 corresponding to $r$ in FIG. 1 acquires the character of a time $\Delta t$ which is added to or subtracted from the time t measured by 5, the time between the control pulses and thus the control angle for the rectifiers 11–16 thus being changed. In the member 100 the time signal $\Delta t$ is changed so that proportionality is reached between the voltage and current change in case of an increase or reduction of the voltage.

The signal from 100 corresponds to the negative value of the control angle change $\Delta\alpha$ occuring at each commutation, since a positive signal $\Delta t$ from 100 means a shortening of the intervals between the control pulses and thus a reduced control angle, that is, a negative $\Delta\alpha$.

The signal from 100 is supplied to the input of the limit value emitter 48'' which comprises a summator 101, a connection member 102 and an integrator 103. The connection member 102 is controlled by the pulses from 18 so that, upon each control pulse, the signal from 100 is released through 102 and is passed on to 103 where the signal pulses are summed up. 103 has a negative input so that the sum of the control angle change $\Sigma\Delta\alpha$ always appears with the right sign. On the output side of 103 there is a limiting member 104 which fixes an upper value for $\Sigma\Delta\alpha$ and thus approximately corresponds to the circuit 53 in FIG. 3. The limit value $\Delta$ tmax for the control signal from 31 is connected by way of the summator 105 and the diode 49' to the output side of 31. A lower value for $\Delta$ tmax is determined with the help of the potentiometer 106 connected to the summator 105, said potentiometer 106 approximately corresponding to circuit 54 in FIG. 3.

By means of the potentiometer 107 a permanent, weak input signal on 103 is secured, so that $\Delta t$ max diminishes. Each reduction of the voltage of the rectifier unit, however, involves an increase in $\Sigma\Delta\alpha$ and thus an increase in $\Delta t$ max, whereas an increase in the voltage involves a reduction of $\Delta$ tmax. The circuit 103 is conveniently so designed that it is saturated at $\Sigma\Delta\alpha =$ approximately 90°.

Instead of connecting the signal $\Delta t$ from 100 to the input 101, it is possible to obtain the difference between the signals from 5 and 6 over the summator 108. The difference signal will be numerically equal to the signal from 100.

I claim:

1. Control system for a rectifier unit (41) for high voltage direct current transmission (43) comprising a control pulse emitter (44) for the valves of the rectifier unit and a regulator 45 for setting the control angle of the control pulse emitter, said regulator on the output side being provided with a signal limiter (48') for limiting the control signal when the voltage of the rectifier unit is increased corresponding to a smaller control angle, in which the control system is provided with a means (50) for sensing the control angle ($\alpha$) of the control pulse emitter, which means is connected to said signal limiter (48') in such a way that the upper limit ($\Delta r_{max}$) of the magnitude of the control signal ($r$) decreases control angle ($\Delta$).

2. Control system according to claim 1, in which said means (50) for sensing the control angle include means to sense the actual magnitude ($\alpha$) of the control angle (FIG. 3).

3. Control system according to claim 1, in which said means (103) for sensing the control angle includes means operative at each commutation to sense the change ($\Delta\alpha$) of the control angle ($\alpha$) since the preceding commutation and to sum up these changes from commutation to commutation, said control signal ($\Delta t$) being limited in relation to the value of said summation (FIG. 5).

* * * * *

UNITED STATES PATENT OFFICE
CERTIFICATE OF CORRECTION

PATENT NO. : 4,023,086
DATED : May 10, 1977
INVENTOR(S) : Lars-Erik Juhlin

It is certified that error appears in the above-identified patent and that said Letters Patent are hereby corrected as shown below:

Column 4, lines 35-61, cancel and replace with

--I CLAIM:

1. Control system for a rectifier unit for high voltage direct current transmission comprising a control pulse emitter for the valves of the rectifier unit and a regulator for setting the control angle of the control pulse emitter, said regulator on the output side being provided with a signal limiter for limiting the control signal to an upper limit value $r_{max}$ when the voltage of the rectifier unit is increased corresponding to a smaller control angle, in which the control system is provided with a means for sensing the control angle ($\alpha$) of the control pulse emitter, which means is connected to said signal limiter in such a way that said upper limit of the magnitude of the control signal (r) is decreased with decreasing control angle ($\alpha$).

UNITED STATES PATENT OFFICE
CERTIFICATE OF CORRECTION

PATENT NO. : 4,023,086
DATED : May 10, 1977
INVENTOR(S) : Lars-Erik Juhlin

It is certified that error appears in the above-identified patent and that said Letters Patent are hereby corrected as shown below:

2. Control system according to claim 1, in which said means for sensing the control angle include means to sense the actual magnitude of the control angle.

3. Control system according to claim 1, in which said means for sensing the control angle includes means operative at each commutation to sense the change ($\Delta\alpha$) of the control angle ($\alpha$) since the preceding commutation and to sum up these changes for commutation to commutation, said control signal ($\Delta t$) being limited in relation to the value of said summation.--

Signed and Sealed this

Ninth Day of March 1982

[SEAL]

Attest:

GERALD J. MOSSINGHOFF

Attesting Officer

Commissioner of Patents and Trademarks